(12) United States Patent  
Nicolas

(10) Patent No.: US 8,806,525 B2
(45) Date of Patent: Aug. 12, 2014

(54) METHOD TO OPTIMIZE RECEPTION OF ENTITLEMENT MANAGEMENT MESSAGES IN A PAY-TV SYSTEM

(75) Inventor: Christophe Nicolas, Saint-Prex (CH)

(73) Assignee: Nagravision, S.A., Cheseaux-sur-Lausanne (CH)

( * ) Notice: Subject to any disclaimer, the term of this patent is extended or adjusted under 35 U.S.C. 154(b) by 0 days.

(21) Appl. No.: 13/985,029

(22) PCT Filed: Jan. 31, 2012

(86) PCT No.: PCT/EP2012/051513
§ 371 (c)(1),
(2), (4) Date: Aug. 12, 2013

(87) PCT Pub. No.: WO2012/110306
PCT Pub. Date: Aug. 23, 2012

(65) Prior Publication Data
US 2013/0326553 A1 Dec. 5, 2013

Related U.S. Application Data

(60) Provisional application No. 61/442,323, filed on Feb. 14, 2011.

(30) Foreign Application Priority Data

Sep. 2, 2011 (EP) .................................... 11179919

(51) Int. Cl.
*H04N 7/16* (2011.01)
*H04N 7/10* (2006.01)
*H04N 7/173* (2011.01)

(52) U.S. Cl.
USPC ............... 725/25; 725/34; 725/100; 725/104; 725/108

(58) Field of Classification Search
CPC ..... H04N 7/1675; H04N 7/173; H04N 7/163; H04N 21/4532; H04N 7/165; H04N 7/17318; H04N 21/4623; H04N 21/812; H04N 21/4331; H04N 21/435; H04N 21/258; H04N 21/25875; H04N 21/235; H04N 21/43615; H04N 21/26606
USPC ........... 725/25, 27, 28, 32, 34, 36, 22, 82, 85, 725/100, 104, 108, 131, 139, 151; 713/150; 707/827
IPC ............................. H04N 7/16,7/10, 7/18, 7/173
See application file for complete search history.

(56) References Cited

U.S. PATENT DOCUMENTS 6,393,562 B1 5/2002 Maillard
6,466,671 B1 10/2002 Maillard et al.

(Continued)

FOREIGN PATENT DOCUMENTS

EP 1 109 405 6/2001
EP 1 411 727 4/2004

(Continued)

OTHER PUBLICATIONS

International Search Report issued in International Application No. PCT/EP2009/056041, mailed Sep. 11, 2009.

(Continued)

*Primary Examiner* — Sherrie Hsia
(74) *Attorney, Agent, or Firm* — DLA Piper LLP US

(57) ABSTRACT

A method to optimize reception of entitlement management messages in a subscriber unit that is part of a Pay-TV system. The subscriber units are set up to a default reception channel for receiving default entitlement management messages such as the ones addressed to all or a group of subscriber units controlled by the management system. When one or a plurality of operating parameters of a specific subscriber unit needs to be modified, the security module sends an information signal to the subscriber unit which switches to a specific reception channel. In this case only specific entitlement management messages, also called positive addressing entitlement management messages, are received for performing the operating parameters modification of the concerned subscriber units. Once the modification is executed, the subscriber unit switches back to the default reception channel to be ready for receiving default entitlement management messages again.

20 Claims, 1 Drawing Sheet

(56) References Cited

U.S. PATENT DOCUMENTS

| | | | |
|---|---|---|---|
| 7,251,617 B1 | 7/2007 | Walker | |
| 7,644,429 B2 | 1/2010 | Bayassi | |
| 2002/0129249 A1 | 9/2002 | Maillard | |
| 2004/0052377 A1 | 3/2004 | Mattox et al. | |
| 2004/0068541 A1 | 4/2004 | Bayassi | |
| 2004/0240394 A1 | 12/2004 | Cochard et al. | |
| 2006/0064443 A1 | 3/2006 | Duval | |
| 2006/0117392 A1 | 6/2006 | Courtin et al. | |
| 2008/0059993 A1 | 3/2008 | Jia et al. | |
| 2009/0150673 A1* | 6/2009 | DeFreese et al. | 725/25 |
| 2009/0153727 A1 | 6/2009 | Shimoda et al. | |
| 2009/0222676 A1 | 9/2009 | Becq et al. | |
| 2011/0099364 A1 | 4/2011 | Robyr | |
| 2011/0099567 A1 | 4/2011 | Moreillon | |

FOREIGN PATENT DOCUMENTS

| | | |
|---|---|---|
| EP | 1 638 331 | 3/2006 |
| EP | 1 662 789 | 5/2006 |
| EP | 1 775 950 | 4/2007 |
| EP | 1 853 000 | 11/2007 |
| FR | 2 894 745 | 6/2007 |
| JP | 2007-129575 | 5/2007 |
| WO | WO 02/062054 | 8/2002 |
| WO | WO 2005/020564 | 3/2005 |
| WO | WO 2009/141328 | 11/2009 |

OTHER PUBLICATIONS

Written Opinion issued in International Application No. PCT/EP2009/056041, mailed Sep. 11, 2009.
English language abstract of EP 1 662 789 published May 31, 2006.
English language abstract of EP 1 638 331 published Mar. 22, 2006.
English language abstract of EP 1 775 950 published Apr. 18, 2007.
English language abstract of FR 2 894 745 published Jun. 15, 2007.
Image File History of U.S. Appl. No. 12/993,805.
Image File History of U.S. Appl. No. 13/927,986.
International Search Report issued in International Application No. PCT/WP2012/051513, dated Mar. 19, 2012.
Written Opinion issued in International Application No. PCT/WP2012/051513, dated Mar. 19, 2012.
English translation and abstract of JP 2007-129575, published May 24, 2007.

* cited by examiner

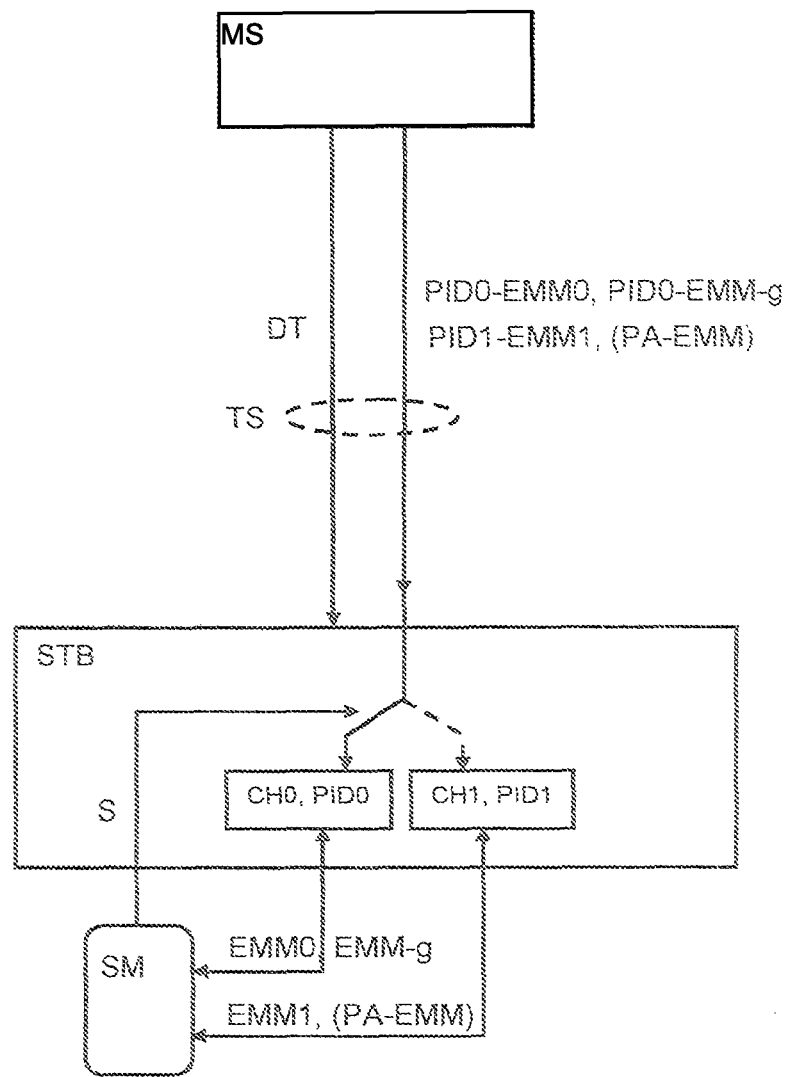

METHOD TO OPTIMIZE RECEPTION OF ENTITLEMENT MANAGEMENT MESSAGES IN A PAY-TV SYSTEM

CROSS-REFERENCE TO RELATED APPLICATIONS

This application is a U.S. National Stage Application of International Application No. PCT/EP2012/051513 filed Jan. 31, 2012, which claims priority from U.S. Provisional Patent Application No. 61/442,323 filed Feb. 14, 2011 and European Patent Application No. 11179919.3 filed Sep. 2, 2011. The entirety of all the above-listed applications are incorporated herein by reference

FIELD OF THE INVENTION

The present invention concerns the field of Pay-TV entitlement management messages, in particular a method to receive messages in case of bandwidth limitation.

TECHNICAL BACKGROUND

MPEG Format

Entitlement control messages (ECM) are sent in the MPEG (Moving Picture Experts Group) transport stream to provide conditional access information for a given MPEG program. In this case, all entitlement control messages for a given MPEG program are packed into a MPEG stream having one packet identifier (PID). Separate entitlement control messages are still associated with respective elementary streams (e.g., video or audio) by use of the stream-index discussed below.

Entitlement control messages bearing MPEG packets are mapped to the program elements (e.g., video and each audio data stream) of an MPEG program using a conditional access descriptor (CA-descriptor) as element stream (ES) information in the program level of the transport stream program map section. The CA-descriptor identifies the entitlement control message PID that carries all of the conditional access entitlement control messages pertaining to the elementary stream associated with the extended ES information.

The CA-descriptor carried in the program map table PMT used as extended ES information includes: a descriptor-tag, a descriptor-length, a CA-system-ID, a CA-PID, and an ECM-information-descriptor. The descriptor-tag is preferably an 8 bit field defined by MPEG standards to be 0x09 indicating that the CA-descriptor is for a conditional access system. The descriptor-length is preferably an 8 bit field representing the number of bytes (or bits, etc.) of the present CA-descriptor. The CA-system-ID is preferably a 16 bit field identifying the particular conditional access system to which the CA-descriptor pertains. There may be more than one. The CA-PID is preferably a 13 bit field carrying the PID value of the entitlement control message bearing packets for the associated elementary stream. The ECM-information descriptor preferably includes one or more 24 bit fields (the number depends on descriptor-length, above) where each 24 bit field includes: an ECM-descriptor-tag, an ECM-descriptor-length, and a stream-index. The ECM-descriptor-tag is an 8 bit field that identifies a characteristic of the associated entitlement control message, for example, identifying the entitlement control message as a stream type descriptor (other descriptor types being possible). The ECM-descriptor length is an 8 bit field that merely identifies the remaining length of the current ECM-information-descriptor (in bytes).

The stream-index is an 8 bit field that identifies the entitlement control messages in a multiple entitlement control message stream that contain information pertaining to the elementary stream associated with the CA-descriptor.

Entitlement control messages for all elementary streams (e.g., video, audio, etc.) of a given program are packed into packets identified by one PID. For example, assume that an MPEG program has (1) a video stream identified by PID 100, an audio stream identified by PID 200, and an entitlement control message stream identified by PID 300.

PID 300 contains entitlement control messages used by both the video and audio data streams. The entitlement control messages for each elementary stream are assigned arbitrary but unique and preferred sequential stream index values. For example, entitlement control messages for the video stream (PID 100) may be assigned a stream-index value of 25, and entitlement control messages for the audio stream (PID 200) may be assigned a stream-index value of 50.

The information contained in the transport stream program map table PMT is used to link entitlement control messages to the correct elementary stream. The CA-descriptor (described above) is looked up in the program map table PMT when the program is selected. For the present example, the program map table PMT identifies the video stream as PID 100 and the audio stream as PID 200. The program map table PMT identifies the CA-descriptor which in turn identifies the CA-system-ID, the CA-PID as 300 (in this example) and the stream-index for the video as 25 and for audio as 50 as discussed above.

Thus, receivers can identify the PID of the video and audio streams from program map table PMT. Further, receivers identify one PID (using the CA-descriptor discussed above) for all entitlement control messages associated with the present program.

However, it is still possible to maintain separate entitlement control messages for each elementary stream by using the stream-index (as discussed above) for each separate elementary stream.

Subscribers' Management

A Conditional Access Table CAT is used also for conditional access to the streams. This CAT table provides association with EMM stream, i.e. Entitlement Managing Messages stream in a specific section. When the transport stream TS is scrambled then this section contains the EMM PID. This EMM PID is encrypted by using an identifier of a security module. The PID value is usually 0x0001.

A security module is a device considered as tamper-proof containing different encryption/decryption keys, information used for identifying a user on a network and data which define rights acquired by the user for the reception of a broadcast audio/video data stream. The security module can be in different forms like a removable smart card inserted in a reader, an integrated circuit soldered onto a motherboard, a SIM type card (Subscriber Identity Module) as inserted in most mobile equipment.

The EMM PID can be communicated to the receiver by the security module. It is then possible that a transport stream TS can have more than one EMM PID. This is the case when the same transport stream TS can be accessed by two different CA systems (Simulcrypt). The security module contains the PID identifier of the EMM and the receiver will then filter this PID to pass the EMM messages to the security module.

In a broadcast environment, subscribers are managed by dedicating a certain bandwidth for the EMM messages. A usual bandwidth for existing subscribers and a special bandwidth for new subscribers can be distinguished.

The bandwidth for existing subscribers will be hereafter referred to as the Usual Bandwidth (UB). The EMMs to manage these existing subscribers are generally using a relatively stable amount of bandwidth. This UB is, to some extent, proportional to the number of subscribers in the broadcast system. Those UB EMMs are used to manage the software used by said existing subscribers. Said software can be embedded in the security module. Additionally, the UB EMMs can be used to perform Positive Addressing, for example as described in WO2009/141328A1. The Positive Addressing technology will be referred to hereafter as PA. The UB EMMs can be used to refresh keys, for example in case of key changes or renew the authorization rights.

Another part of the EMM bandwidth, that will be referred to as Special Bandwidth or SB, is used for setting up the authorization process for new subscribers that enroll into the broadcast environment.

An unresolved problem comes from the fact that those enrollments usually come in bulk, with a quite unstable rate. For example, users can choose to enroll preferably when they come back home and not during usual working hours. One can also expect peaks in demand for enrollments during prime time, shortly before a big sports event, over the week-end, or during the Christmas gifts season. These circumstances will be generally referred to as peak hour, or peak hours, in the detailed description of the invention.

The existing technology, and a usual way to operate a conditional access system CAS, is to use one EMM PID i.e. one EMM channel for broadcasting both types of EMMs: EMMs for existing subscribers and EMMs for new subscribers.

This has an impact on the overall bandwidth that is needed for EMMs in general, because of the unstable character of the SB. Moreover, it has a negative impact on the time a new subscriber will need to enroll, having to wait to get the authorization EMMs, because in the known art, all EMMs are queued and cycled one after the others.

In is known from JP 2007-129575 that an ECM/EMM transmission module generates a communication packet for which channel information is added to an ECM/EMM extracted from broadcast waves and transmits it to other receivers. An ECM/EMM reception module receives the communication packet and stores the ECM/EMM together with the channel information. Receivers descramble the broadcast waves of the channel of a switching object by using the ECM/EMM stored by the ECM/EMM reception module when switching the channel.

In the document WO 2005/020564 it is disclosed an apparatus and a method for receiving a plurality of encrypted digital video, audio and data that require an encryption key to decode before utilizing. Specifically this document is directed toward devices such as cable and digital broadcast satellite systems that transmit multiple channel information to receivers that provide users access to the multiple channels upon particular channel selection. Such channel selection requires decrypting and formatting a new data stream through a time consuming electronic process.

This document WO 2005/020564 describes a solution to reduce the channel change time, by monitoring de-scrambled data in the background, prior to a user selecting a new channel. Digital broadcast data contain input de-scrambling control words required for the decoding of N-bit de-scrambling keys for each of a multiplicity of digital data streams available. Storing the data control words or the N-bit descramble keys reduces subsequent retrieval decoding time.

SUMMARY OF THE INVENTION

The aim of the present invention is to overcome the drawbacks of the prior art EMMs transmission method by optimizing the cycle time of the EMMs by moving at least the Positive Addressing EMMs (PA EMMs) on another EMM packet identifier PID.

This aim is achieved by a method to optimize the reception of entitlement messages in a Pay-TV system, said Pay-TV system comprising at least one management system and a plurality of subscriber units, each subscriber unit, associated to a security module, receives a transport stream comprising audio/video program data and entitlement management messages providing to the subscriber unit and the security module conditional access information for a given Pay-TV program, the entitlement management messages being identified in the transport stream by packet identifiers are received by the subscriber unit via a default reception channel, the method comprises steps of:

receiving, by the subscriber unit from the security module, an information signal notifying a requirement to modify at least one operating parameter controlling the subscriber unit or the security module or both the subscriber unit and the security module, the information signal activating a specific reception channel, selecting the specific reception channel configured for receiving specific entitlement management messages including instructions and data for modifying the operating parameter, said specific entitlement management messages having a specific packet identifier, at reception of the specific entitlement management message, modifying the operating parameter according to instructions and data comprised in the specific entitlement management message, after terminating the modification of the operating parameter, selecting the default reception channel configured for receiving default entitlement management messages having a default packet identifier.

The subscriber units are set up to a default reception channel for receiving default entitlement management messages such as the ones addressed to all or a group of subscriber units controlled by the management system. When one or a plurality of operating parameters of a specific subscriber unit needs to be modified, the security module sends an information signal to the subscriber unit which switches to a specific reception channel. In this case only specific entitlement management messages, also called positive addressing entitlement management messages, are received for performing the operating parameters modification of the concerned subscriber units. Once the modification is executed, the subscriber unit switches back to the default reception channel to be ready for receiving default entitlement management messages again.

BRIEF DESCRIPTION OF THE DRAWING

The invention will be better understood with the following detailed description, which refers to the attached figure given as a non-limitative example.

FIG. 1 shows a block diagram of a pay-TV system comprising a subscriber unit receiving program data and management entitlement messages from a management system, a security module sends an information signal to the subscriber unit for switching a reception channel for the management entitlement messages having a given packet identifier.

DETAILED DESCRIPTION OF THE INVENTION

FIG. 1 illustrates a Pay-TV system which comprises at least one management system MS and a plurality of subscriber units STB. Each subscriber unit STB comprises a security module SM and receives a transport stream TS comprising audio/video program data DT and entitlement management messages EMM providing to the subscriber unit STB and the security module SM conditional access information for a given Pay-TV program. The entitlement management messages EMM, identified in the transport stream TS by packet identifiers PID, are received by the subscriber unit STB via a default reception channel CH0.

The security module SM, responsible for processing entitlement management messages EMM0, sends an information signal S to the subscriber unit STB when at least one operating parameter becomes obsolete. Upon reception of the information signal S, the subscriber unit activates and selects a specific reception channel CH1 configured for receiving entitlement management messages EMM1 having a particular packet identifier PID1 different from the default packet identifier PID0 identifying the default entitlement management messages EMM0. The operating parameters comprise at least one or a combination of security module and subscriber unit software program parameters, expiry dates, reception rights, payment data cryptographic keys, software update patches, etc. which controls functioning of the subscriber unit STB and/or the security module SM.

According to an embodiment, the information signal S activates a specific reception channel CH1 pre-selected in the subscriber unit STB as specific channel configured for receiving specific entitlement management messages EMM1. This pre-selection may be performed at first installation of the subscriber unit which connects to the management system MS by using the appropriate settings and protocols.

According to a further embodiment, the information signal S activates the specific reception channel CH1 by executing an instruction comprised in the information signal S. This instruction includes the necessary parameters as for example a channel identifier for designating and selecting the specific channel CH1 to be used for receiving specific entitlement management messages EMM1.

The specific entitlement management messages EMM1 modify or update the operating parameter by means of instructions and data included in the message EMM1. After the modification or update has been executed, the subscriber unit STB selects the default reception channel CH0 for receiving the default entitlement management messages EMM0 which are transferred to the security module SM and checked by the same.

The information signal S may be generated in two different ways:

1) The information signal is generated and transmitted by a user application embedded in the security module SM detecting any requirement to change or update an operating parameter. If necessary, the information signal S notifies that a modification or an update of the operating parameter needs to be performed by positive addressing entitlement management messages PA-EMM i.e. a specific entitlement management message EMM1 having the specific packet identifier PID1.

Positive addressing PA means that an entitlement management message is addressed to a particular subscriber unit STB identified by a specific identifier or address such as a unique serial number respectively a network address which is encapsulated in the entitlement management message by the management system MS.

According to an embodiment the information signal S is transmitted by the security module SM at a predefined time period T1 before an update of the operating parameter is required and indicates which packet identifier PID1 or which reception channel CH1 has to be selected. The subscriber unit STB switches thus to the specific reception channel CH1 for receiving the specific entitlement management messages EMM1 when the subscriber unit STB is idle i.e. no commands are sent by the user for a predetermined time period T2, such as switching from one channel to another. The time periods T1 and T2 may be configurable individually according to user preferences.

2) The subscriber unit STB receives from the management system MS a global management message EMM-g via the default reception channel CH0. This global management message EMM-g carries an instruction and an indication of the packet identifier PID1 or channel CH1 to select for receiving the specific management messages PA EMM, EMM1. The instruction is processed and verified by the security module SM to check that said instruction is addressed to the concerned subscriber unit STB or not. When the verification is successful, i.e. the address of the subscriber unit STB belongs to a set of addresses or to a group defined by a range of addresses included in the global management message EMM-g, the security module SM generates and sends to the subscriber unit STB the information signal S enabling switching to the specific reception channel CH1. Contrarily when the subscriber unit STB is not concerned, no information signal S is generated by the security module SM.

The specific management messages PA EMM, EMM1 are sent by the management system MS in particular when the peak hours happens, in order to optimize the cycle time for new subscribers, and letting the existing subscribers know that the PA EMM, EMM1 have been moved to that specific packet identifier PID1 for that period of time.

After the modification or update of the operating parameter is terminated, the subscriber unit STB switches back to the default reception channel CH0 after a preconfigured time period T3 starting from reception of the global management message EMM-g. As well as the time periods T1 and T2, this time period T3 is also configurable.

According to an embodiment, the subscriber unit STB switches back to the default reception channel (CH0) after receiving a further specific management message EMM1 having the specific packet identifier PID1 via the specific reception channel CH1. This further specific management message EMM1 carries thus an instruction for the security module SM to generate the information signal S enabling switching back the subscriber unit STB to the default reception channel CH0.

The method of the present invention may also be used to defeat illegal emulation subscriber units STB. Such illegal subscriber units STB can for example emulate partially the behavior of a legitimate subscriber unit STB, for example a subscriber unit STB implementing the DVB standard and partially emulating a proprietary system. A specific management message EMM1 may instruct the subscriber unit STB to modify one or several operating parameters to disable illegal subscriber units while the legitimate subscriber units will still operate in a normal way.

The invention claimed is:

1. A method to optimize reception of entitlement management messages in a subscriber unit comprising a security module, said subscriber unit being configured to receive a transport stream comprising audio/video program data and entitlement management messages providing to the subscriber unit and the security module conditional access information for a given Pay-TV program, the entitlement management messages being identified in the transport stream by packet identifiers and being received by the subscriber unit via a default reception channel, the method comprising the steps of:

receiving, by the subscriber unit from the security module, an information signal including a notification of a requirement to modify at least one operating parameter controlling the subscriber unit or the security module or both the subscriber unit and the security module, the information signal specifying a specific reception channel;

selecting, by the subscriber unit, the specific reception channel configured for receiving specific entitlement management messages including instructions and data for modifying the operating parameter, said specific entitlement management messages having a specific packet identifier;

after reception of the specific entitlement management message, modifying the operating parameter according to instructions and data comprised in the specific entitlement management message; and after modification of the operating parameter, selecting the default reception channel configured for receiving default entitlement management messages having a default packet identifier.

2. The method according to claim 1, wherein the information signal is transmitted by a user application embedded in the security module, said information signal further specifying positive addressing entitlement management messages having the specific packet identifier.

3. The method according to claim 2, wherein the information signal is transmitted by the security module at a predefined time before updating the operating parameter, the subscriber unit switching to the specific reception channel for receiving the specific entitlement management messages having the specific packet identifier when said subscriber unit is idle during a predetermined period in an absence of user commands.

4. The method according to claim 1, wherein the subscriber unit receives a global management message via the default reception channel, the global management message carrying an instruction which is processed and verified by the security module to check that said instruction is addressed to the subscriber unit, and when the verification is successful the security module generates the information signal enabling the subscriber unit to switch to the specific reception channel configured for receiving specific entitlement management messages having a specific packet identifier.

5. The method according to claim 4, wherein the subscriber unit switches back to the default reception channel after a preconfigured time period starting from reception of the global management message.

6. The method according to claim 4, wherein the subscriber unit switches back to the default reception channel after a predefined time period transmitted by the security module to the subscriber unit after reception of the global management message.

7. The method according to claim 4, wherein the subscriber unit switches back to the default reception channel after receiving a further specific management message having the specific packet identifier via the specific reception channel, said further specific management message carrying an instruction for the security module to generate the information signal enabling switching back the subscriber unit to the default reception channel.

8. The method according to claim 1, wherein the operating parameter comprises at least one or a combination of security module and subscriber unit software program parameters, expiry dates, reception rights, payment data, cryptographic keys, software update patches.

9. The method according to claim 1, wherein the information signal specifies a specific reception channel pre-selected in the subscriber unit as the specific channel configured for receiving specific entitlement management messages.

10. The method according to claim 1, wherein the information signal specifies the specific reception channel by including an instruction in the information signal, said instruction designating and selecting the specific channel configured for receiving specific entitlement management messages when executed.

11. A device comprising:
a security module; and
a subscriber unit configured to receive a transport stream comprising audio/video program data and entitlement management messages providing to the subscriber unit and the security module conditional access information for a given Pay-TV program, the entitlement management messages being identified in the transport stream by packet identifiers and being received by the subscriber unit via a default reception channel;

wherein the device is configured to:
receive at the subscriber unit from the security module, an information signal including a notification of a requirement to modify at least one operating parameter controlling the subscriber unit or the security module or both the subscriber unit and the security module, the information signal specifying a specific reception channel;

select at the subscriber unit, the specific reception channel configured for receiving specific entitlement management messages including instructions and data for modifying the operating parameter, said specific entitlement management messages having a specific packet identifier;

after reception of the specific entitlement management message, modify the operating parameter according to instructions and data comprised in the specific entitlement management message; and after modification of the operating parameter, select the default reception channel configured for receiving default entitlement management messages having a default packet identifier.

12. The device of claim 11, wherein the information signal is transmitted by a user application embedded in the security module, said information signal further specifying positive addressing entitlement management messages having the specific packet identifier.

13. The device of claim 12, wherein the information signal is transmitted by the security module at a predefined time before updating the operating parameter, the subscriber unit switching to the specific reception channel for receiving the specific entitlement management messages having the specific packet identifier when said subscriber unit is idle during a predetermined period in an absence of user commands.

14. The device of claim 11, wherein the subscriber unit receives a global management message via the default reception channel, the global management message carrying an instruction which is processed and verified by the security module to check that said instruction is addressed to the subscriber unit, and when the verification is successful the security module generates the information signal enabling the subscriber unit to switch to the specific reception channel configured for receiving specific entitlement management messages having a specific packet identifier.

15. The device of claim 14, wherein the subscriber unit switches back to the default reception channel after a preconfigured time period starting from reception of the global management message.

16. The device of claim 14, wherein the subscriber unit switches back to the default reception channel after a predefined time period transmitted by the security module to the subscriber unit after reception of the global management message.

17. The device of claim 14, wherein the subscriber unit switches back to the default reception channel after receiving a further specific management message having the specific packet identifier via the specific reception channel, said further specific management message carrying an instruction for the security module to generate the information signal enabling switching back the subscriber unit to the default reception channel.

18. The device of claim 11, wherein the operating parameter comprises at least one or a combination of security module and subscriber unit software program parameters, expiry dates, reception rights, payment data, cryptographic keys, software update patches.

19. The device of claim 11, wherein the information signal specifies a specific reception channel pre-selected in the subscriber unit as the specific channel configured for receiving specific entitlement management messages.

20. The device of claim 11, wherein the information signal specifies the specific reception channel by including an instruction in the information signal, said instruction designating and selecting the specific channel configured for receiving specific entitlement management messages when executed.

* * * * *